United States Patent
Kjær et al.

(10) Patent No.: US 9,065,329 B2
(45) Date of Patent: Jun. 23, 2015

(54) RECONFIGURABLE POWER CONVERTER MODULE

(75) Inventors: Philip Carne Kjær, Aarhus (DK); Lars Helle, Suldrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 354 days.

(21) Appl. No.: 13/143,846

(22) PCT Filed: Jan. 12, 2010

(86) PCT No.: PCT/EP2010/050280
§ 371 (c)(1),
(2), (4) Date: Sep. 28, 2011

(87) PCT Pub. No.: WO2010/079234
PCT Pub. Date: Jul. 15, 2010

(65) Prior Publication Data
US 2012/0038167 A1 Feb. 16, 2012

Related U.S. Application Data

(60) Provisional application No. 61/143,997, filed on Jan. 12, 2009.

(30) Foreign Application Priority Data

Jan. 12, 2009 (DK) .................................. 2009 00039

(51) Int. Cl.
*F03D 9/00* (2006.01)
*H02P 9/04* (2006.01)
*H02M 1/12* (2006.01)
*H02J 3/38* (2006.01)

(52) U.S. Cl.
CPC ........ *H02M 1/12* (2013.01); *H02J 3/386* (2013.01); *Y02E 10/763* (2013.01)

(58) Field of Classification Search
CPC ......... H02M 1/12; Y02E 10/763; H02J 3/386
USPC ....................................... 290/44, 55
See application file for complete search history.

(56) References Cited

U.S. PATENT DOCUMENTS 5,083,039 A * 1/1992 Richardson et al. ............ 290/44
5,225,712 A * 7/1993 Erdman ........................ 290/44
(Continued)

FOREIGN PATENT DOCUMENTS

DE   102004004627 A1   8/2005
DE   102006036092 A1   2/2008
EP        1638195 A2    3/2006

OTHER PUBLICATIONS

International Search Report for Application No. PCT/EP2010/050280 dated May 19, 2010.

*Primary Examiner* — Pedro J Cuevas
*Assistant Examiner* — Viet Nguyen
(74) *Attorney, Agent, or Firm* — Patterson & Sheridan, LLP

(57) ABSTRACT

Embodiments provide a reconfigurable power converter module for a wind turbine facility adapted to supply electric power to an associated power supply grid. The reconfigurable power converter module includes a frequency converter operatively connected to filter means, wherein the frequency converter and the filter means are mutually reconfigurable so as to suppress internal and/or external resonances or harmonics.

20 Claims, 2 Drawing Sheets

(56) References Cited

U.S. PATENT DOCUMENTS

Figure 1:
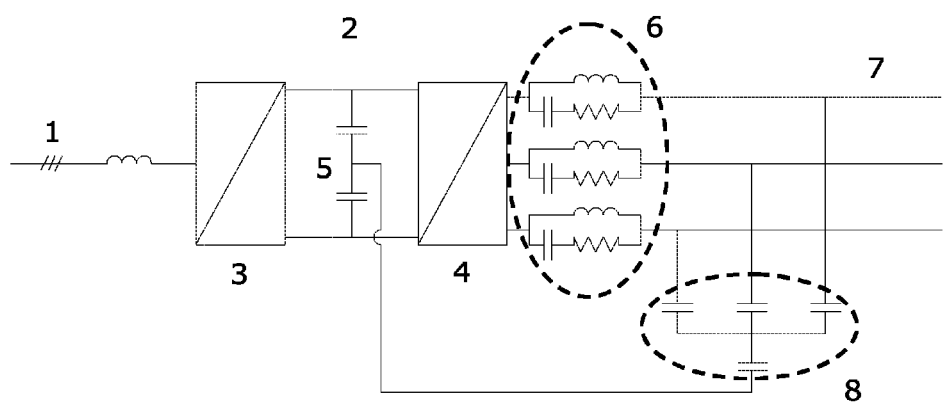

| Patent Number | | Date | Inventor(s) | Class |
|---|---|---|---|---|
| 5,448,154 | A * | 9/1995 | Kanke et al. | 322/28 |
| 5,526,252 | A | 6/1996 | Erdman | |
| 5,907,192 | A * | 5/1999 | Lyons et al. | 290/44 |
| 5,999,423 | A * | 12/1999 | Steinke et al. | 363/40 |
| 6,703,718 | B2 * | 3/2004 | Calley et al. | 290/44 |
| 6,836,028 | B2 * | 12/2004 | Northrup et al. | 290/44 |
| 7,042,110 | B2 * | 5/2006 | Mikhail et al. | 290/44 |
| 7,239,036 | B2 * | 7/2007 | D'Atre et al. | 290/44 |
| 7,362,557 | B2 * | 4/2008 | Soudier et al. | 361/93.8 |
| 7,573,146 | B2 * | 8/2009 | Calley | 290/44 |
| 7,622,815 | B2 * | 11/2009 | Rivas et al. | 290/44 |
| 7,692,323 | B2 * | 4/2010 | Ichinose et al. | 290/44 |
| 7,888,915 | B2 * | 2/2011 | Zhao et al. | 322/47 |
| 7,939,954 | B2 * | 5/2011 | Ruiz Flores et al. | 290/44 |
| 7,999,405 | B2 * | 8/2011 | Peterson | 290/40 C |
| 8,030,791 | B2 * | 10/2011 | Lang et al. | 290/44 |
| 8,093,739 | B2 * | 1/2012 | Gilchrist et al. | 290/44 |
| 8,466,661 | B2 * | 6/2013 | Helle et al. | 322/44 |
| 2005/0275386 | A1 * | 12/2005 | Jepsen et al. | 322/9 |
| 2006/0250115 | A1 * | 11/2006 | Johnson | 322/58 |
| 2007/0085344 | A1 * | 4/2007 | Janssen et al. | 290/44 |
| 2008/0062728 | A1 * | 3/2008 | Jones et al. | 363/41 |
| 2009/0096211 | A1 * | 4/2009 | Stiesdal | 290/44 |
| 2009/0279336 | A1 * | 11/2009 | Erdman et al. | 363/131 |
| 2010/0007145 | A1 * | 1/2010 | Calley | 290/44 |
| 2010/0094474 | A1 * | 4/2010 | Larsen et al. | 700/287 |
| 2010/0109328 | A1 * | 5/2010 | Li et al. | 290/44 |
| 2010/0308584 | A1 * | 12/2010 | Coates et al. | 290/44 |
| 2012/0049521 | A1 * | 3/2012 | Ichinose et al. | 290/44 |

* cited by examiner a)

b)

c)

RECONFIGURABLE POWER CONVERTER MODULE

FIELD OF THE INVENTION

The present invention relates to a reconfigurable power converter module for wind turbine facilities. In particular, the present invention relates to a power converter having an adjustable switching frequency in order to comply with, for example, changed filter characteristics, such as changed filter impedances, in order to suppress internal and external resonances/harmonics.

BACKGROUND OF THE INVENTION

Power overload situations and unwanted resonance scenarios regularly occur within the field of wind turbine related energy supply. An overload situation occurs when a required amount of electrical power exceeds the nominal power level of the power distribution network delivering the power. In order to handle such overload situations the power distribution network must have access to available power reserves. Unwanted and disturbing resonance scenarios may be caused shifting impedance and may occur within a wind turbine facility or between a wind turbine facility and an associated power supply grid.

Overload capacities of power converters for wind turbine systems are typically established by overrating semiconductor switch components for higher continuous operating current. Alternatively, additional semiconductor switch components are added to provide a required overload capacity. However, additional switch components increase the overall losses of the converters.

It is a drawback of the above-mentioned conventional solutions that the costs of components and thereby the costs of manufacturing are high. Moreover, increased electric losses are related to the above-mentioned ways of establishing a required overload capacity. Also the addition of more components increases the risk of a component failure.

WO 2005/027301 deals with a method for handling low voltage ride through events where a DC/AC converter is operated with a reduced switching frequency in order to pump additional current into a power supply grid in case the grid voltage drops significantly.

It may be seen as an object of embodiments of the present invention to provide an arrangement and an associated method for establishing overload capacities without increasing the complexity and the costs of manufacturing of a power converter.

It may be seen as a further object of embodiments of the present invention to provide a reconfigurable arrangement being capable of avoiding or suppressing internal resonances/harmonics within a wind turbine and external resonances/harmonics between a wind turbine and some external devices.

DESCRIPTION OF THE INVENTION

The above-mentioned objects are complied with by providing, in a first aspect, a wind turbine facility adapted to deliver electrical energy to an associated power supply grid, the wind turbine facility comprising generator means for converting mechanical energy to electrical energy, the generator means being mechanically coupled to a set of rotor blades optionally via a gearing arrangement, and an electric power converter electrically coupled to the generator means and the associated power supply grid, optionally through a grid transformer, the electric power converter comprising a number of controllable switching elements being switchable with a variable or changeable switching frequency wherein the switching frequency of the controllable switching elements is selected in accordance with an electrical load generated by the associated power supply grid on the wind turbine facility. Thus, the load generated by the associated power supply grid determines the switching frequency of the converter.

It should be noted that the term wind turbine facility should be interpreted broadly. Thus, the term wind turbine facility covers a single wind turbine or a group of wind turbines forming a wind turbine farm.

The generator means comprises a power generator. Similarly, the electric power converter comprises an AC/DC and/or DC/AC converter. Preferably, the power generator, the AC/DC and/or DC/AC converter and the optional grid transformer are all configured to operate in a three-phase configuration.

The power generator may deliver a three-phase AC output voltage having a voltage level in the range 0.4-6 kV. Moreover, the power generator may be capable of generating and delivering AC power in a wide power range, i.e. from a few kW to several MW. The nominal frequency of the generated power supplied to the power supply grid may be 50 Hz or 60 Hz.

The power generator may be a synchronous generator applying external magnetisation or, alternatively, a synchronous generator applying permanent magnets for magnetisation. Alternatively, an induction generator or doubly fed induction generator may be applied. However, the generator type is not limited to the before-mentioned types. Thus, the present invention may be implemented in connection with basically any type of electrical generator.

Also, the present invention is applicable on both full-scale and doubly fed arrangements, the latter involving that the electric power converter is at least partly coupled with the generator through the rotor circuit. In a full-scale system all power generated by the power generator is passed through the AC/DC and/or DC/AC converter and the optional grid transformer.

The controllable switching elements of the electric power converter may be any traditional switching element available for such purposes, such as IGBTs. Moreover, the controllable switching elements may be arranged in various known bridge configurations with respect to the number of phases in the system.

In one embodiment of the present invention, the electric power converter may be configured to lower the switching frequency when the electrical load generated by the associated power supply grid and the consumers connected thereto exceeds a predetermined value. The predetermined value may correspond to a nominal power level of the converter. Alternatively, the switching frequency may be lowered when the electric power converter exhibits a given set of load dependent characteristics. Thus, the wind turbine facility, including its electric power converter and its other electric devices may be operated in an overload scenario in a proactive manner.

Electric power converters for wind turbine related applications are typically dimensioned in such a way that the electric losses in the semiconductor switching elements are split approximately evenly between conduction and switching losses. Thus, if the switching frequency is reduced to 50% of a given initial value the switching losses are lowered with approximately 25%.

In the case of, for example, a planned overload situation, the wind turbine facility is, when operated with a reduced switching frequency, capable of delivering sufficient power even though the required power level exceeds the nominal power level of the facility. Since an overload situation is considered an abnormal mode (non stationary) of operation, electromagnetic compatibility (EMC) standards generally do not apply.

Thus, the switching frequency may be lowered up to 50% (or even more) when the electrical load generated by the associated power supply grid exceeds the nominal power level of the converter. In terms of absolute frequency values the nominal switching frequency of an electric power converter is typically around a few kHz.

The wind turbine facility may further comprise converter filters for filtering electric power leaving the electric power converter, i.e. electric power being generated to the power supply grid. The implementation of converter filters is preferably identical for all phases. Thus, if one phase is equipped with one or more tuned LC-filters for suppressing selected harmonics the remaining phases are preferably equipped with identical filters.

Converter filters may, alternatively, be implemented as active filters. Preferably, the active filters are operated with a switching frequency being significantly higher than the switching frequency of the converter itself. The active filters may be implemented as voltage-source converters.

By lowering the switching frequency in a doubly fed system, the power rating may be increased and therefore the wind turbine facility can provide more reactive power via both available converters for reactive power or via only one of the converters.

In a second aspect, the present invention relates to a method of operating an electric power converter of a wind turbine facility in response to load variations provided by an associated power supply grid, wherein the wind turbine facility comprises generator means for converting mechanical energy to electrical energy and an electric power converter electrically coupled to the generator means and the associated power supply grid, optionally through a grid transformer, the electric power converter comprising a number of controllable switching elements being switchable with a variable or changeable switching frequency, wherein the switching frequency of the controllable switching elements is selected in accordance with an electrical load generated by the associated power supply grid on the wind turbine facility. Thus, the load generated by the associated power supply grid determines the switching frequency of the converter.

Again, to reduce switching losses the switching frequency may be lowered when the electrical load generated by the associated power supply grid in combination with consumers connected thereto exceeds a predetermined value, such as the nominal power level of the converter. In this way the electric power converter may be operated above its nominal power level in a short time period.

As previously mentioned the switching frequency may be lowered with up to 50% (or even higher) in overload situations where the electrical load generated by the associated power supply grid exceeds the nominal power level of the converter.

The method according to the second aspect of the present invention may also imply that the switching frequency is varied so as to approximately match load dependent characteristics of converter filters in that such converter filter characteristics may be dependent on the electrical load generated by the associated power supply grid. Converter filters are typically designed for being operated at a specific switching frequency. However, since converter filters contain magnetic materials (iron, iron powder or ferrite cores) the characteristics of the filters will change with the load applied to the filters. Thus, in order to utilize the converter filters in an optimal manner, the switching frequency of the power converter may be continuously adjusted so as to follow the behaviour of the converter filters.

Preferably, the converter filters comprise band-pass filters. Thus, the converter filter characteristics may involve the frequency values of the centre frequencies of such band-pass converter filters.

Also, the second aspect of the present invention implies that the switching frequency of the electric power converter may be varied or adjusted so as to compensate for degradation or tolerances of the components of the wind turbine facility as a whole. In particular capacitors degrade over time.

In a third aspect the present invention relates to a reconfigurable power converter module for a wind turbine facility adapted to supply electric power to an associated power supply grid, the converter module comprising a frequency converter operatively connected to filter means having load dependent filter characteristics, wherein a switching frequency of said frequency converter is variable so as to comply with one or more changed filter characteristics.

It is an advantage of the power converter module according to the third aspect that electrical resonances/harmonics within a wind turbine facility can be suppressed by properly selecting the switching frequency of a DC/AC converter of the power converter module. Preferably, the switching frequency is selected in accordance with load dependent impedances of the filter means. Thus, if a filter impedance, for example an inductor, changes due to a load change the switching frequency of the IGBTs of the DC/AC converter may be changed accordingly to avoid internal resonances within the wind turbine facility.

Similar to the first aspect it should be noted that the term wind turbine facility should be interpreted broadly. Thus, the term wind turbine facility covers a single wind turbine or a group of wind turbines forming a wind turbine farm.

The reconfigurable power converter module is operatively connected to a power generator for converting wind/mechanical energy to electrical energy. Moreover, the configurable power converter is operatively connected to the associated power supply grid, optionally via a grid transformer. The power generator may be of the type mentioned in connection with the first aspect of the present invention. Thus, the power generator may be of the type being applicable in full-scale or doubly fed generator systems.

The frequency converter may comprise an AC/DC and/or DC/AC converter. Preferably, the power generator, the frequency converter and the optional grid transformer are all configured to operate in a three-phase configuration.

The frequency converter may be reconfigurable in that its switching frequency may be variable so as to adjust to power grid related events. Such grid related events may relate to an overload situation where the frequency converter may be configurable to lower its switching frequency when an electrical load generated by the associated power supply grid, and the consumers operatively connected thereto, exceeds a predetermined value, such as a nominal power level of the power converter module. More specifically, the switching frequency may be lowered up to 50% (or even higher) when the electrical load generated by the associated power supply grid exceeds the nominal power level of the converter. By lowering the switching frequency the switching losses of the frequency converter is lowered significantly.

The filter means are adapted to filter electric power leaving the frequency converter, i.e. electrical power generated to the power supply grid. The implementation of filter means is preferably identical for all phases. Thus, if one phase is equipped with one or more tuned LC-filters for suppressing selected harmonics the remaining phases are preferably equipped with identical filters. The filter means may, alternatively, be implemented as active filters. Preferably, the active filters are operated with a switching frequency being significantly higher than the switching frequency of the frequency converter. The active filters may be implemented as voltage-source converters.

In a fourth aspect, the present invention relates to a wind turbine comprising a reconfigurable power converter module according to the third aspect. The wind turbine may be a doubly fed system or a full-scale system. Moreover, in a fifth aspect the present invention relates to a wind turbine plant comprising a plurality of wind turbines as set forth in the above-mentioned fourth aspect.

In a sixth and final aspect the present invention relates to a method for reconfiguring a power converter module for a wind turbine facility adapted to supply electric power to an associated power supply grid, the method comprising the step of adjusting a switching frequency of a frequency converter to comply with a load related impedance change.

Generally, the switching frequency is changed in order to:
1. Increase the thermal capacity of the power converter module and/or
2. Suppress resonances within the wind turbine facility and/or suppress resonances between the wind turbine facility and the surroundings.

Again the term wind turbine facility should be understood broadly. The switching frequency may be the switching frequency of IGBTs of a DC/AC converter forming part of the power converter module.

Thus, the switching frequency may be adjusted to comply with an impedance change in a filter due to a load change. Alternatively or in combination therewith, the switching frequency may be adjusted to comply with an impedance change in a grid transformer due to a load change. Alternatively or in combination with the before mentioned scenarios the switching frequency may be adjusted to comply with an impedance change in a power supply grid due to a load change.

Again, in terms of implementation the wind turbine facility, the power converter module and the filter means may be implemented as disclosed in connection with the previous aspects of the present invention.

BRIEF DESCRIPTION OF THE INVENTION

Figure 2:
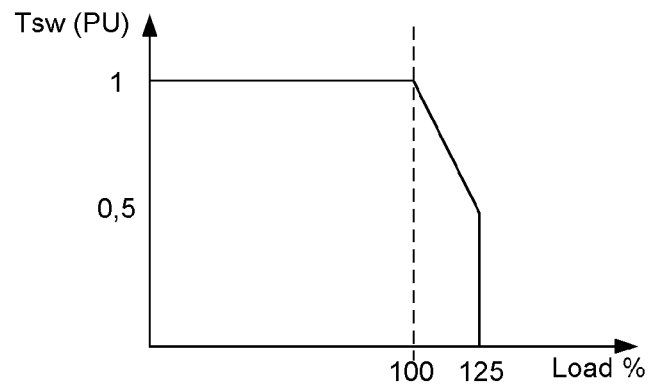
Figure 2:
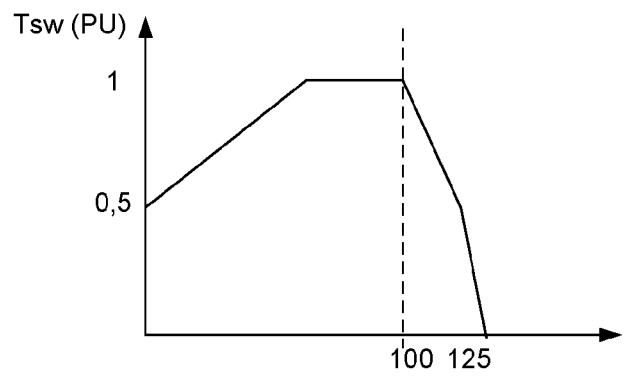
Figure 2:
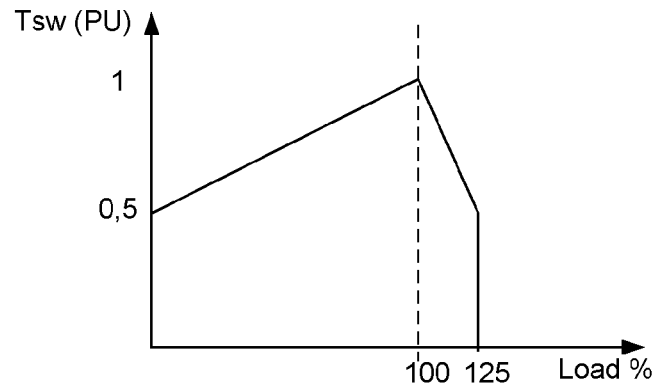

The present invention will now be explained in further details with reference to the accompanying figures, wherein FIG. 1 shows a power converter with filter means connected thereto, FIG. 2a shows a first example of a relationship between a load and the switching frequency, FIG. 2b shows a second example of a relationship between a load and the switching frequency, and FIG. 2c shows a third example of a relationship between a load and the switching frequency.

While the invention is susceptible to various modifications and alternative forms, specific embodiments have been shown by way of example in the figures and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

Detailed Description Of The Drawings

In its broadest aspect the present invention relates to a reconfigurable power converter, and an associated method, adapted to suppress internal and/or external resonance phenomena. The reconfigurable power converter comprises a frequency converter with a variable switching frequency and filter means operatively connected thereto, said filter means having load dependent filter impedances.

Grid related events may in principle be any event influencing the load of the grid on the reconfigurable power converter. The embodiments of the present invention are, in particular, useful in wind power related applications. However, the embodiments of the present invention are not limited to such applications.

FIG. 1 shows a full-scale power system, where a three-phase supply line 1 provides AC power to a full-scale AC/AC converter 2 which may be operatively connected to a grid transformer (not shown), the latter typically being a step-up transformer. The AC/AC converter 2 is implemented as a frequency converter having a rectifier 3 and an inverter 4—the two being separated by an intermediate DC circuit 5.

As shown in FIG. 1 passive tuned filter means 6 are connected to the power lines 7. The impedances of the filter means 6 are load dependent. Thus, if the load caused by the power supply grid changes the impedances of the filter means 6 changes accordingly. The impedances of the filter means can be selected to match specific working conditions so as to optimize the performance characteristics of the reconfigurable power converter module itself, and the performance of a wind turbine facility including such reconfigurable power converter module.

Moreover, common-mode filters 8 are provided between the power lines 7 and the intermediate DC circuit 5.

When the load generated by the power supply grid changes the impedances of the filter means changes as well. To avoid resonances within the wind turbine facility, and avoid resonances between the wind turbine facility and the grid to occur, the switching frequency of the inverter 4 can be changed. Moreover, if the switching frequency is lowered the thermal capacity of inverter is increased Referring now to FIG. 2a an example of a relationship between a switching frequency (Tsw) of a power converter and a load is depicted. As depicted in FIG. 2a the power converter is operated at a nominal switching frequency (PU=1) until the load reaches a level corresponding to nominal load (100%). Above nominal load, i.e. at overload conditions, the switching frequency is reduced linearly until the load reaches a level corresponding to 125% of the nominal load. The converter is closed down if the load increases further. The linear dependency between switching frequency and load may differ from the depiction shown in FIG. 2a. Similarly, the close down level may differ from the 125% level depicted in FIG. 2a.

As previously mentioned, electric power converters are typically dimensioned in such a way that the electric losses in the semiconductor switching elements are split approximately evenly between conduction and switching losses. Thus, if the switching frequency is reduced with 50% the switching losses are lowered with 25%. The reduced losses facilitate that the converter is operable in an overload mode of operation. Typically, the nominal switching frequency of power converters is around 5 kHz.

FIGS. 2b and 2c depict other relationships between the switching frequency (Tsw) and the load. As seen various dependencies both below and above the nominal load level are possible.

The invention claimed is:

1. A reconfigurable power converter module for a wind turbine facility, the wind turbine facility configured to generate and supply electric power to an associated electrical load that includes a power supply grid, the power converter module comprising:
a frequency converter operatively connected with one or more filters having filter characteristics dependent on an amount of the electrical load,
wherein the power converter module is configured to modify a switching frequency of the frequency converter responsive to a change in one or more of the filter characteristics,
wherein the power converter module is further configured to operate the frequency converter:
at one or more first switching frequencies for values of the electrical load less than a nominal load value of the power converter module, and
at a plurality of second switching frequencies for values of the electrical load between the nominal load value and a first threshold load value that is greater than the nominal load value, wherein the second switching frequencies decrease linearly from a nominal switching frequency corresponding to the nominal load value to a third switching frequency corresponding to the first threshold load value.

2. The power converter module of claim 1, wherein the change in one or more filter characteristics comprises a change in a filter impedance.

3. The power converter module of claim 1, wherein the power converter module is configured to modify the switching frequency to approximately match the load-dependent characteristics of the one or more filters.

4. The power converter module of claim 3, wherein the load-dependent characteristics include a filter impedance.

5. The power converter module of claim 1, wherein the one or more filters includes one or more active filters, each active filter having a respective switching frequency greater than the switching frequency of the frequency converter.

6. The power converter module of claim 5, wherein the one or more active filters comprise voltage source converters.

7. The power converter module of claim 1, wherein the one or more first switching frequencies includes one constant frequency.

8. The power converter module of claim 1, wherein the power converter module is further configured to shut down for values of the electrical load greater than the first threshold value.

9. The power converter module of claim 1, wherein the frequency converter includes an AC/AC converter comprising a rectifier, an inverter, and an intermediate DC circuit.

10. The power converter module of claim 1, wherein the power converter module is configured to modify the switching frequency to compensate for degradation of one or more components of the wind turbine facility in order to prevent resonances caused by the degraded one or more components.

11. The power converter module of claim 1, wherein the one or more first switching frequencies increase linearly for values of the electrical load less than a second threshold load value.

12. The power converter module of claim 11, wherein the second threshold load value is the nominal load value.

13. The power converter module of claim 11, wherein the second threshold load value is less than the nominal load value, and wherein the one or more first switching frequencies further includes a constant frequency for values of the electrical load between the second threshold load value and the nominal load value.

14. The power converter module of claim 1, wherein the first threshold load value is 125% of the nominal load value.

15. A wind turbine configured to generate and supply electric power to an associated electrical load that includes a power supply grid, the wind turbine comprising:
a reconfigurable power converter module that includes:
a frequency converter operatively connected to one or more filters having filter characteristics dependent on an amount of the electrical load,
wherein the power converter module is configured to modify a switching frequency of the frequency converter responsive to a change in one or more of the filter characteristics,
wherein the power converter module is further configured to operate the frequency converter:
at one or more first switching frequencies for values of the electrical load less than a nominal load value of the power converter module, and
at a plurality of second switching frequencies for values of the electrical load between the nominal load value and a first threshold load value that is greater than the nominal load value, wherein the second switching frequencies decrease linearly from a nominal switching frequency corresponding to the nominal load value to a third switching frequency corresponding to the first threshold load value.

16. A wind turbine plant comprising a plurality of wind turbines according to claim 15.

17. A method of reconfiguring a power converter module for a wind turbine facility configured to generate and supply electric power to an associated electrical load that includes a power supply grid, wherein the power converter module includes a frequency converter operatively connected with one or more filters having filter characteristics dependent on an amount of the electrical load, the method comprising:
modifying, responsive to a load-related impedance change, a switching frequency of the frequency converter,
wherein the power converter module is configured to operate the frequency converter:
at one or more first switching frequencies for values of the electrical load less than a nominal load value of the power converter, and
at a plurality of second switching frequencies for values of the electrical load between the nominal load value and a first threshold load value that is greater than the nominal load value, wherein the second switching frequencies decrease linearly from a nominal switching frequency corresponding to the nominal load value to a third switching frequency corresponding to the first threshold load value.

18. The method of claim 17, wherein the load-related impedance change occurs in the one or more filters.

19. The method of claim 17, wherein the load-related impedance change occurs in a grid transformer coupled to the power converter module.

20. The method of claim 17, wherein the load-related impedance change occurs in the power supply grid.

* * * * *